US00RE34032E

United States Patent [19]

Callaghan

[11] E Patent Number: Re. 34,032

[45] Reissued Date of Patent: Aug. 18, 1992

[54] PROJECTILE TOY

[76] Inventor: Michael L. Callaghan, 12385 via Estrella, Yuma, Ariz. 85365

[21] Appl. No.: 693,009

[22] Filed: Apr. 29, 1991

Related U.S. Patent Documents

Reissue of:

[64] Patent No.: 4,826,179
Issued: May 2, 1989
Appl. No.: 41,108
Filed: Apr. 22, 1987

[51] Int. Cl.[5] ..... A63B 65/00; A63B 37/00

[52] U.S. Cl. ..... 273/428; 273/58 R

[58] Field of Search ..... 273/58 R, 58 C, 184 B, 273/185 B, 319, 330, 332, 335, 413, 414, 415, 417, 420, 428

[56] References Cited

U.S. PATENT DOCUMENTS

| | | | |
|---|---|---|---|
| 1,081,037 | 12/1913 | Hackh | 273/428 |
| 2,311,160 | 2/1943 | Dobbelaar | 273/415 |
| 3,147,976 | 9/1964 | Millar | 273/415 |
| 3,368,815 | 2/1968 | Alabastro | 273/417 |
| 3,393,911 | 7/1968 | Lawson | 273/428 |
| 3,862,757 | 1/1975 | Craig, II | 273/58 C |
| 4,088,319 | 5/1978 | Clarke | 273/428 |
| 4,127,268 | 11/1978 | Lindgren | 273/58 C |
| 4,294,447 | 10/1981 | Clark | 273/428 |
| 4,657,253 | 4/1987 | Lerner et al. | 273/428 |
| 4,696,472 | 9/1987 | Meyer | 273/58 C |

*Primary Examiner*—William H. Grieb
*Assistant Examiner*—Raleigh W. Chiu
*Attorney, Agent, or Firm*—Limbach & Limbach

[57] ABSTRACT

A projectile toy and method of using same wherein the projectile toy has a weighted nose and segmented fabric tail attached thereto. In flight, the tail is subjected to aerodynamic forces which create an unpredictable fine trajectory and points are gained by catching the toy by a tail segment having values roughly proportional to the difficulty of catching that particular segment of the tail.

11 Claims, 1 Drawing Sheet

PROJECTILE TOY

Matter enclosed in heavy brackets [ ] appears in the original patent but forms no part of this reissue specification; matter printed in italics indicates the additions made by reissue.

INTRODUCTION

This invention relates generally to recreational devices and methods of playing therewith, and more particularly to a safe projectile toy having a segmented tail and the novel method of keeping score when playing therewith.

BACKGROUND OF THE INVENTION

Projectile toys are old in the art including some having tails or other appendages. For example, Lawson (U.S. Pat. No. 3,393,911) teaches a comet toy having a nose, body portion, and a decorative tail. This toy is launched by swinging it about the distal end of its body portion in order to obtain maximum certifugal force prior to lift off. The primary goal of the toy is to provide a pleasing visual effect.

Another, Clarke (U.S. Pat. No. 4,088,319) teaches a game ball having a substantially straight foam tail which is intended to be resilient and have structural memory. The toy is launched by swinging it about the end of the tail remote from the ball. While this toy may be caught by its tail, no particular significance attaches to the feat.

Clark (U.S. Pat. No. 4,294,447) teaches an aerial amusement projectile having a streamer tail which acts as a drogue. This device is also launched by swinging the toy by its tail. The primary purpose of the device is to provide a visually pleasing effect.

Alabastro (U.S. Pat. No. 3,368,815) also teaches a projectile toy having a tail and method of playing therewith. Alabastro also has streamers which act as a drogue.

Blue (U.S. Pat. No. 4,266,781) teaches a toy having a resilient nose and a rigid tail. The user bounces the toy off of a hard surface and attempts to catch the toy on the rebound. The tail may be used to add impetus to the toy through centrifugal force.

As is apparent, there is no known prior art which discloses a toy and methods of playing therewith wherein the objective is to out score an opponent by being more skillful in catching the toy by its tail, the tail being provided with a plurality of segments, each having a different point value which is reflective of the general difficulty of catching the tail by that particular segment.

SUMMARY OF THE INVENTION

The tail section is constructed of light weight material such as nylon. The tail is tapered with its widest dimension nearest the nose of the device and its and narrowest dimension at the tip of the tail. In shape, the tail is essentially an elongated cone and the nose section is inserted in and attached across the open mouth of the cone. The tail is completely flexible, has no internal support, and does not maintain its gross shape in use. In fact, when desired, the tail can be rolled up around the nose section to form a compact pseudo-spheroid which can be thrown like a baseball or softball. The device may also be launched by hitting, kicking, swinging by the tail or by any other desired convenient method for projecting an object through space.

By its nature, the tail acts as a drogue upon the nose section of the device, tending to both stabilize and retard the travel of the nose when it is used in an environment having a substantial ambient atmosphere, which may be buffeting or otherwise deflecting the tail. Therefore, while the nose follows, for example, a basic parabolic trajectory, after due effect is made for air resistance, the tail, and particularly the portions thereof furthest from the nose, follow a complex unpredictable composite trajectory.

In play, a different number of points is awarded for catching the device by each of the different segments of the tail. As the nose follows a relatively predictable trajectory, zero or minimal points are awarded for catching the device by its nose. However, the interaction of the weighted nose with the segmented trailing tail creates a more challenging situation. The weight of the nose allows a speed to be attained which causes the wafting tail segments to pass the receiver in a relatively rapid and unpredictable flight pattern which provides a significant challenge to the receiver's reflexes. Experience reveals that the segment nearest the nose is the most difficult segment to catch. This difficulty is reduced the further the catch is removed from the nose. Increasing numbers of points are awarded for the more difficult catches with lesser points for the easier catch. To aid in scoring, each of the segments and the nose covering will preferably be formed of fabrics of different but contrasting colors. For example, the nose could be yellow, the tail section closest to the nose could be blue, the intermediate segment white, and the tail segment furthest from the nose could be red. These colors, red, white, yellow and blue are visually pleasing and contrasting and would give the device a generally pleasing appearance. Of course, other contrasting colors can be adopted within the scope of the invention.

Accordingly, a primary object of the present invention is to provide a new and unique recreational device containing a nose and an elongated tail, the remote end of which is readily deflected by aerodynamic forces.

Another object of the present invention is to provide a new and useful projectile toy including a deflectable tail having a plurality of discrete transverse longitudinal segments by which a player's score can be determined.

A still further object of the present invention is to provide a method of playing with a new and useful projectile toy wherein a different point score is awarded for successfully catching the toy by each particular segment of its tail.

These and still further objects as shall hereinafter appear are readily fulfilled by the present invention in a remarkably unexpected manner as will be readily discerned from the following detailed description of an exemplary embodiment thereof particularly when read in conjunction with the accompanying drawing in which like parts bear like numerals throughout the several views.

DESCRIPTION OF PREFERRED EMBODIMENTS

Figure 1:
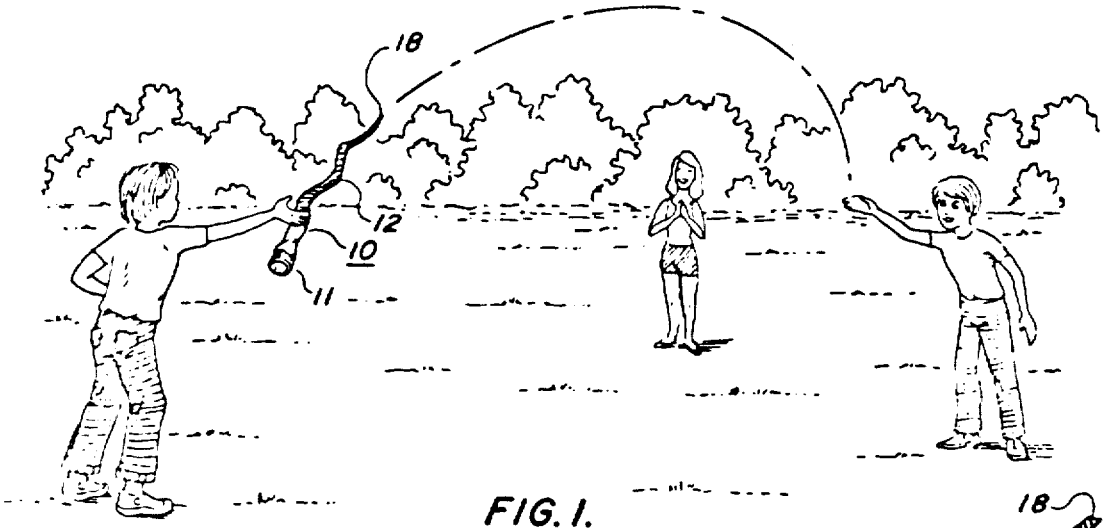
FIG. 1 is an isometric drawing of youngsters engaged in play with a device embodying the present invention.
Figure 2:
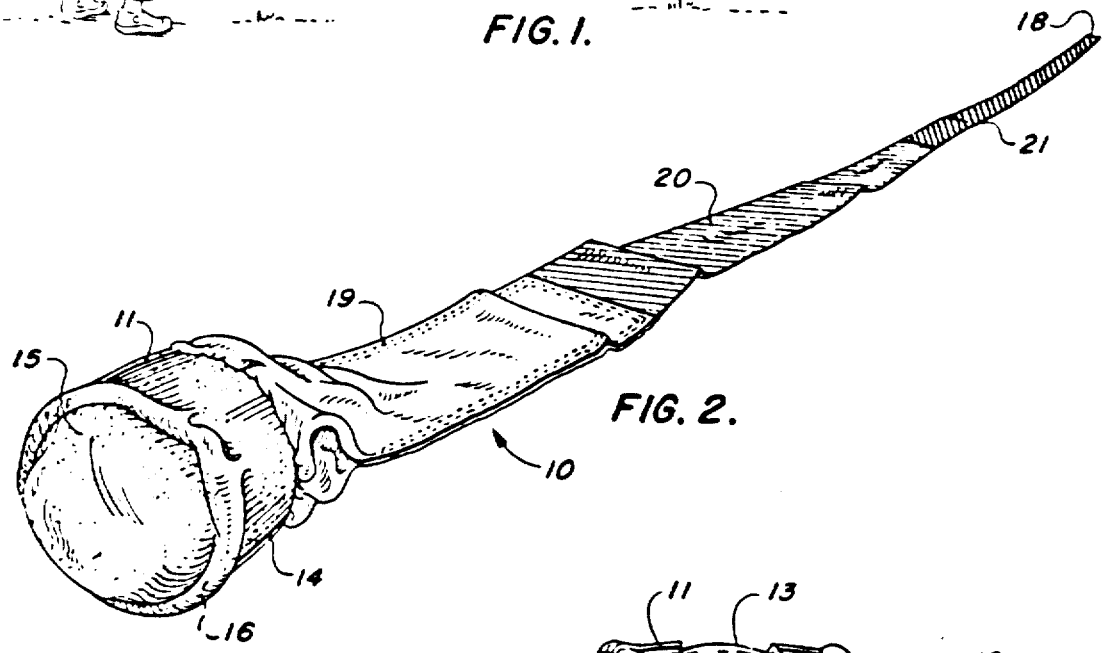
FIG. 2 is an isometric view of a device embodying the present invention.
Figure 3:
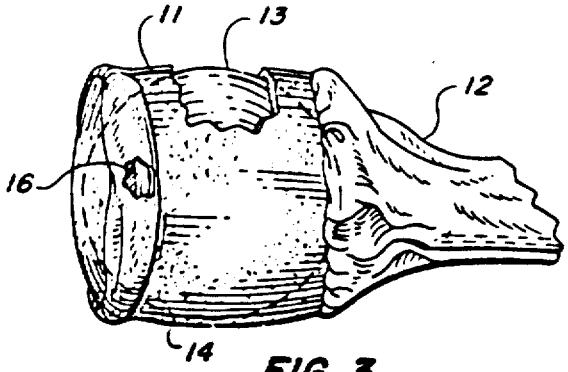
FIG. 3 is an enlarged fragmented view of the nosetail interface of a device embodying the present invention.

Referring to FIGS. 1-3, the device of the present invention is identified by the general reference 10. Each device 10 comprises a nose section 11 and a tail section 12. Each nose section 11 comprises a weighted core portion 13 wrapped in a suitable covering 14. In one practice of the present invention, weighted core portion 13 can be formed with a Super Ball®, a hand ball or other small dense hard rubber-like balls. Covering 14 preferably is provided with a base 15 having a circular ring 16 disposed therein for receiving and seating core 13 therein. Leather, or leather-like material is the material choice for cover 14. A welted seam (as shown in FIG. 3), a conventional baseball stitch (not shown) or the like can be readily employed to secure cover 14 in place.

Tail section 12 as shown in FIG. 2, is generally tapered from its greatest cross-sectional width adjacent to nose section 11 to its least cross-sectional width adjacent to tip 18 thereof. For purposes of illustration, tail section 12 is shown with three tapered segments 19, 20, 21, although additional segments may be provided if desired to enhance the skill required to score. Segment 19 is the segment adjacent nose section 11, segment 21 is the segment most remote from nose section 12, and segment 20 is that segment disposed intermediate segments 19 and 21. The stitches disposed along the lateral edges of segment 19 are decorative only.

For ease in scoring, each segment 19, 20, 21 will preferably be provided with a different color material, for example, segment 19 can be yellow, segment 20 can be white, and segment 21 can be blue. In such a case, the color of cover 14 could be red or any other color which would contrast with the color assigned the adjacent segment 19. As is apparent, any marking system which assures that the various segments will be visually distinct will meet the functional requirements of this invention.

In one method of playing with the device 10, one player throws the device to another player. The catching player then attempts to catch the device by its tail. Points are awarded for catching the device and the number of points is dependent upon the relative difficulty of the catch, for instance, the smaller the segment, the higher the points. In general, the closer the segment is to the nose, the harder it is to catch and therefore will be awarded more points than the segment most removed from the nose.

In flight it has been determined that the weighted nose of the device follows a trajectory path that is basically parabolic. The cross-sectional density of the nose is sufficiently great that atmospheric buffeting does not significantly affect this trajectory, although the atmospheric drag of the tail does tend to retard both the horizontal velocity of the nose and the distance which the device will travel.

On the other hand, the precise trajectory followed by the tail, particularly the remote segments thereof, is not easily defined and therefore requires good coordination to complete the catch. The segment adjacent the nose, both because of its speed of flight and its axial length will require excellent reflexes to catch and therefore evokes the higher score. As explained, the tail is not a rigid body. It is not under external tension. Its cross-sectional density is low and, because it generally decreases in cross-section as the distance from the nose increases, the density of the tip is even less. Thus, the tail is more subject to atmospheric forces, such as lift and drag, which change constantly as the aerodynamic forces are superimposed upon the gravitational forces, the net effect is that the degree of difficulty in catching the device varies substantially between the nose portion and the tip portion. The point award, as explained above, is therefore deliberately related to the difficulty in making the catch, e.g., catching the device by tail segment 19 requires extremely quick reflexes while catching the device on its downward accelerating arc by remote segment 21, while not too easy, can be accomplished with slower reflexes.

The device can be launched in many ways. It can be kicked, hit by a bat or paddle, thrown as a ball, or centrifugally launched by using the tail as a tether. It can provide the central object to play a variation of the baseball game known as "Over-The-Line" which is currently quite popular on the beaches of Southern California. The device also provides a suitable alternative to the 16-inch softball in pick-up games at the shore because it enables substantially all ages to participate without the need of extra baggage in the form of gloves or mitts.

In one practice of the present invention, leather, denim and like wear-resistant materials have been found suitable for fabricating cover 14 and nylon and the like provide good results for the tail section 12. The tail section 12 is easily attached to cover 14 after the weighted core 13 has been seated in ring 16 and the cover 14 wrapped thereabout in any suitable fashion as by sewing and the like. Any brightly colored fabric can be used to fabricate the several tail segments.

From the foregoing it is readily apparent that a projectile toy has been herein described and illustrated which fulfills all of the aforesaid objectives in a remarkably unexpected fashion. It is, of course, understood that such modifications, alterations and adaptations, as may readily occur to the artisan skilled in the field to which this invention pertains when confronted with this specification, are intended within the spirit of the present invention which is limited only by the scope of the claims appended hereto.

Accordingly, what is claimed is:

1. A projectile toy comprising a weighted nose section, said nose section having a weighted core portion disposed therein and a cover portion wrapped thereabout to secure said core portion therewithin; a pliable generally conical segmented tail section attached to said nose section; and a circular ring member disposed within said cover portion for seating said weighted core portion therewithin.

2. A projectile toy according to claim 1 in which said tail section comprises a plurality of segments commencing with said nose section and tapering therefrom to a tip.

3. A projectile toy according to claim 2 in which each segment is provided with an appearance which is visually distinct from any segment adjacent thereto.

4. A projectile toy according to claim 2 in which the mean cross-sectional width of each segment is larger than the adjacent segment disposed more remote from said nose section.

5. A projectile toy comprising a nose section and a tail section, said nose section having a small dense hard spherical core and a protective covering wrapped thereabout and secured thereto; a ring member disposed in said protective covering for seating said core therein;

said tail section being fixedly attached to said nose section and having a plurality of segments trailing therefrom, each segment having a visual appearance distinct from any segment adjacent thereto, the mean cross-sectional width of each of said segments nearer to said nose section being substantially greater than the mean cross-sectional area of said trailing segments adjacent thereto, said tail section creating a flowing motion behind said nose section when said nose portion is launched by hitting, kicking or throwing.

*6. A projectile toy comprising:*

*a weighted nose portion; and*

*a tail having a first end connected to the nose portion and a second end located distally from the nose portion, said tail including a plurality of segments serially arranged from said first tail end to said second tail end, with each segment being of a different color.*

*7. The projectile toy of claim 6 wherein the tail is tapered, having its largest cross-section near the nose portion.*

*8. The projectile toy of claim 7 wherein the tail cross-section near the nose portion is approximately equal to the nose portion cross-section.*

*9. A projectile toy comprising:*

*a weighted nose portion; and*

*a tail having a first end connected to the nose portion and a second end located distally from the nose portion, said tail including a plurality of segments serially arranged from said first tail end to said second tail end, with each segment having a visual appearance distinct from any segment adjacent thereof.*

*10. The projectile toy of claim 9 wherein each segment is a different color.*

*11. The projectile toy of claim 10 wherein the tail is tapered, having its largest cross-section near the nose portion.*

* * * * *